(12) United States Patent
Tsutanaga et al.

(10) Patent No.: US 7,966,688 B2
(45) Date of Patent: Jun. 28, 2011

(54) CLEANING TOOL AND CLEANING ELEMENT

(75) Inventors: Hajime Tsutanaga, Fukuoka (JP); Jun Uragami, Fukuoka (JP); Toshihiko Uenishi, Fukuoka (JP); Masaho Hayashi, Tokyo (JP); Yoshinori Tanaka, Kanonji (JP)

(73) Assignee: Uni-Charm Corporation, Ehime (JP)

( * ) Notice: Subject to any disclaimer, the term of this patent is extended or adjusted under 35 U.S.C. 154(b) by 627 days.

(21) Appl. No.: 12/042,437

(22) Filed: Mar. 5, 2008

(65) Prior Publication Data

US 2008/0216263 A1    Sep. 11, 2008

(30) Foreign Application Priority Data

Mar. 5, 2007    (JP) .................................. 2007-054927

(51) Int. Cl.
*A47L 13/16* (2006.01)
*A47L 13/38* (2006.01)
*A47L 13/46* (2006.01)

(52) U.S. Cl. .......... 15/229.3; 15/229.4; 15/223; 15/226; 15/145; 15/209.1

(58) Field of Classification Search ................ 15/145, 15/209.1, 229.3
See application file for complete search history.

(56) References Cited

U.S. PATENT DOCUMENTS

| | | | | |
|---|---|---|---|---|
| 1,437,145 A | * | 11/1922 | Johnson | 15/210.1 |
| 2006/0101602 A1 | * | 5/2006 | Lin et al. | 15/229.3 |
| 2008/0040879 A1 | * | 2/2008 | Yang | 15/231 |

FOREIGN PATENT DOCUMENTS

JP            09-154791 A      6/1997

* cited by examiner

*Primary Examiner* — Monica S Carter
*Assistant Examiner* — Stephanie Newton
(74) *Attorney, Agent, or Firm* — Brinks Hofer Gilson & Lione

(57) ABSTRACT

A cleaning tool and an effective technique for realizing a higher cleaning effect in the cleaning tool having a cleaning element for wiping a region to be cleaned is provided. A representative cleaning tool for wiping a region to be cleaned includes an elongate cleaning element holder, and a cleaning element having an outer surface which has predetermined dimensions and can extend in a longitudinal direction of the cleaning element holder. The cleaning element is attached to the cleaning element holder. When the cleaning element is attached to the cleaning element holder, the cleaning element is wrapped in a helical form around an outer surface of the cleaning element holder in such a manner that the cleaning element outer surface moves toward the outer surface of the cleaning element holder.

10 Claims, 9 Drawing Sheets

CLEANING TOOL AND CLEANING ELEMENT

CROSS-REFERENCE TO RELATED APPLICATION

The present application claims priority under 35 U.S.C. §119 to Japanese Patent Application JP2007-054927, filed on Mar. 5, 2007. The content of the application is incorporated herein by reference in its entirety.

BACKGROUND OF THE INVENTION

1. Field of the Invention

The present invention relates to a cleaning tool, and more particularly to a cleaning tool having a cleaning element for wiping a region to be cleaned.

2. Description of the Related Art

Cleaning tools with a sheet-type cleaning element for wiping a cleaning region are known. For example, Japanese non-examined laid-open Patent Publication No. 9-154791 discloses a cleaning tool having cleaning fabric and a holder that detachably holds the cleaning fabric inserted into a holding region of the cleaning fabric. This cleaning tool is capable of wiping a region to be cleaned by using the cleaning fabric held via the holder. However, in designing a cleaning tool of this type having a cleaning element, it is required to provide an effective technique for enhancing its cleaning effect.

SUMMARY OF THE INVENTION

Accordingly, it is an object of the invention to provide an effective technique for realizing a higher cleaning effect in a cleaning tool having a cleaning element for wiping a region to be cleaned.

The above-described problem can be solved by the features of the claimed invention. This invention can be applied to the construction of cleaning tools for cleaning regions to be cleaned (floors, walls, ceilings, external walls, furniture, clothes, curtains, bedding, home electric appliances, etc.) inside and outside of houses, apartments, buildings, factories, vehicles, etc. or regions of human body parts to be cleaned. These regions to be cleaned may be either flat or curved, uneven or stepped.

A cleaning tool according to an embodiment of this invention is used for wiping a region to be cleaned and includes at least a cleaning element holder and a cleaning element. The cleaning element holder is an elongate member. The cleaning element has an outer surface which has predetermined dimensions and can extend in a longitudinal direction of the cleaning element holder. The cleaning element is designed to be attached to the cleaning element holder. Particularly, the cleaning tool is constructed such that, when the cleaning element is attached to the cleaning element holder, the cleaning element is wrapped in a helical form around an outer surface of the cleaning element holder in such a manner that the cleaning element outer surface moves toward the outer surface of the cleaning element holder. In other words, the cleaning tool is constructed such that, when the cleaning element is wrapped in a helical form around the holder outer surface, the cleaning element outer surface moves toward the holder outer surface and is thus positioned on the internal side of the cleaning element. Thus, the cleaning element outer surface always faces the holder outer surface or is kept in contact with the holder outer surface.

With such a construction of the cleaning tool, when the cleaning element is wrapped in a helical form around the outer surface of the cleaning element holder, a cleaning face is created over the entire face of the cleaning element around the cleaning element holder, and the volume of the cleaning element is increased. Therefore, dust can be trapped on the entire face of the cleaning element, so that the cleaning effect can be enhanced. Further, as the cleaning face is created over the entire face of the cleaning element, the user can use the cleaning tool without being concerned about the position of the cleaning face of the cleaning element during cleaning operation, so that the operability is improved.

Further, provision of the cleaning tool having the cleaning element wrapped in a helical form around the outer surface of the cleaning element holder may either be realized by providing a mechanism which applies a wrapping force around the outer surface of the cleaning element holder to the cleaning element, or by user's direct wrapping operation of wrapping the cleaning element around the cleaning element holder.

A cleaning tool of another embodiment according to this invention is used for wiping a region to be cleaned and includes at least a cleaning element holder and a cleaning element. The cleaning element holder is an elongate member. Further, the cleaning element holder has two holding parts for holding the cleaning element. The cleaning element is designed to be attached to the cleaning element holder. The cleaning element has first and second held regions to be held by the respective two holding parts. The cleaning tool is constructed such that, when the cleaning element is attached to the cleaning element holder, the first held region is held by the associated holding part and then rotated in this state together with the associated holding part, so that the cleaning element is twisted between the first and second held regions and thus wrapped in a helical form around an outer surface of the cleaning element holder.

With such a construction of the cleaning tool, like the above-described cleaning tool, in the wrapped state of the cleaning element, a cleaning face is created over the entire face of the cleaning element around the cleaning element holder, and the volume of the cleaning element is increased. Therefore, dust can be trapped on the entire face of the cleaning element, so that the cleaning effect can be enhanced. Further, as the cleaning face is created over the entire face of the cleaning element, the user can use the cleaning tool without being concerned about the position of the cleaning face of the cleaning element during cleaning operation, so that the operability is improved.

In a further embodiment of the cleaning tool according to this invention, preferably, the cleaning element includes a sheet element of non-woven fabric and a fiber assembly which are stacked in layer and bonded together, and the fiber assembly has a plurality of fibers extending in a predetermined direction. When the cleaning element is attached to the cleaning element holder, the cleaning element is wrapped in a helical form around the outer surface of the cleaning element holder such that the sheet element is positioned on the internal side of the cleaning element.

With such a construction of the cleaning tool, a cleaning face is created by the fiber assembly over the entire face of the cleaning element around the cleaning element holder. Therefore, dust can be trapped by the fiber assembly on the entire face of the cleaning element.

A cleaning element according to an embodiment of this invention is attached to an elongate cleaning element holder and used to wipe a region to be cleaned. Particularly, the cleaning element has a cleaning element outer surface which has predetermined dimensions and can extend in a longitudinal direction of the cleaning element holder. When the cleaning element is attached to the cleaning element holder, the cleaning element is wrapped in a helical form around an outer surface of the cleaning element holder in such a manner that the cleaning element outer surface moves toward the outer surface of the cleaning element holder.

With such a construction of the cleaning element, in the wrapped state of the cleaning element, a cleaning face is created over the entire face of the cleaning element around the cleaning element holder, and the volume of the cleaning element is increased. Therefore, dust can be trapped on the entire face of the cleaning element, so that the cleaning effect can be enhanced. Further, as the cleaning face is created over the entire face of the cleaning element, the user can use the cleaning tool without being concerned about the position of the cleaning face of the cleaning element during cleaning operation, so that the operability is improved.

Further, provision of the cleaning tool in which the cleaning element is wrapped in a helical form around the outer surface of the cleaning element holder may either be realized by providing a mechanism which applies a wrapping force around the outer surface of the cleaning element holder to the cleaning element, or by user's direct wrapping operation of wrapping the cleaning element around the cleaning element holder.

A cleaning element of another embodiment according to this invention is attached to an elongate cleaning element holder and used to wipe a region to be cleaned. The cleaning element has a predetermined length and includes first and second held regions to be held by respective two holding parts on the cleaning element holder in the length direction of the cleaning element. The cleaning element is constructed such that, when the cleaning element is attached to the cleaning element holder, the first held region is held by the associated holding part and then rotated in this state together with the associated holding part, so that the cleaning element is twisted between the first and second held regions and thus wrapped in a helical form around an outer surface of the cleaning element holder.

With such a construction of the cleaning element, like the above-described cleaning element, in the wrapped state of the cleaning element, a cleaning face is created over the entire face of the cleaning element around the cleaning element holder, and the volume of the cleaning element is increased. Therefore, dust can be trapped on the entire face of the cleaning element, so that the cleaning effect can be enhanced. Further, as the cleaning face is created over the entire face of the cleaning element, the user can use the cleaning tool without being concerned about the position of the cleaning face of the cleaning element during cleaning operation, so that the operability is improved.

In a further embodiment of the cleaning element according to this invention, preferably, the cleaning element includes a sheet element of nonwoven fabric and a fiber assembly which are stacked in layer and bonded together, and the fiber assembly has a plurality of fibers extending in a predetermined direction. When the cleaning element is attached to the cleaning element holder, the cleaning element is wrapped in a helical form around the outer surface of the cleaning element holder such that the sheet element is positioned on the internal side of the cleaning element.

With such a construction of the cleaning tool, a cleaning face is created by the fiber assembly over the entire face of the cleaning element around the cleaning element holder. Therefore, dust can be trapped by the fiber assembly on the entire face of the cleaning element.

In the cleaning element according to an embodiment this invention, the sheet element of nonwoven fabric may comprise a single nonwoven fabric sheet layer or a plurality of nonwoven fabric sheet layers having the same or different functions and stacked in layer. The "nonwoven fabric" herein has a sheet-like configuration formed by fixing or entangling fibers by mechanical, chemical or heat treatment. Typically, the nonwoven fabric partly includes thermal melting fibers (thermoplastic fibers) and thus can be fusion bonded. Further, preferably, the fiber assembly having a plurality of fibers extending in a predetermined direction may have a planar structure having a predetermined flat or curved surface and have a three-dimensional form having a certain thickness or a thin sheet-like form. The "fibers" herein are elements of yarn, textile or the like and defined as being thin and flexible fibers having a substantially longer length compared with the thickness. Typically, a long continuous fiber is defined as a filament and a short fiber as a staple. Further, the "fiber assembly" herein is a single fiber structure formed by the above-mentioned fibers, a fiber structure having the above-mentioned fibers aligned in the length direction and/or the radial direction (twist yarn, spun yarn, yarn to which a plurality of filaments are partially connected), or an assembly of the fiber structures. Typically, the fiber assembly is formed of polyethylene (PE), polypropylene (PP), polyethylene terephthalate (PET), nylon, rayon or the like. In practical use, an assembly of filaments formed by opening a tow is frequently used as the fiber assembly.

Further, the cleaning element may be of disposable type designed for single use, disposable type designed for multiple use which can be used several times, while holding dust which has been removed from the region to be cleaned, on a brush portion, or reusable type which can be reused by washing.

As described above, in a cleaning tool having a cleaning element for wiping a region to be cleaned, particularly by provision of the construction in which the cleaning element is wrapped in a helical form around a cleaning element holder when the cleaning element is attached to the cleaning element holder, a cleaning face can be created over the entire face of the cleaning element around the cleaning element holder. Therefore, the cleaning effect of the cleaning element can be enhanced. Other objects, features and advantages of the present invention will be readily understood after reading the following detailed description together with the accompanying drawings and the claims.

DETAILED DESCRIPTION OF THE INVENTION

Each of the additional features and method steps disclosed above and below may be utilized separately or in conjunction with other features and method steps to provide improved cleaning tools and method for using such cleaning tools and devices utilized therein. Representative examples of the invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings. A representative embodiment of the present invention is now described with reference to the drawings. First, the structure of a cleaning tool 100 according to this embodiment is explained with reference to FIGS. 1 to 3. Objects to be cleaned with the cleaning tool 100 includes regions to be cleaned (floors, walls, windows, ceilings, external walls, furniture, clothes, curtains, bedding, lighting, home electric appliances, etc.) inside and outside of houses, apartments, buildings, factories, vehicles, etc. and regions of human body parts to be cleaned. These regions to be cleaned may be either flat or curved, uneven or stepped.

Figure 1:
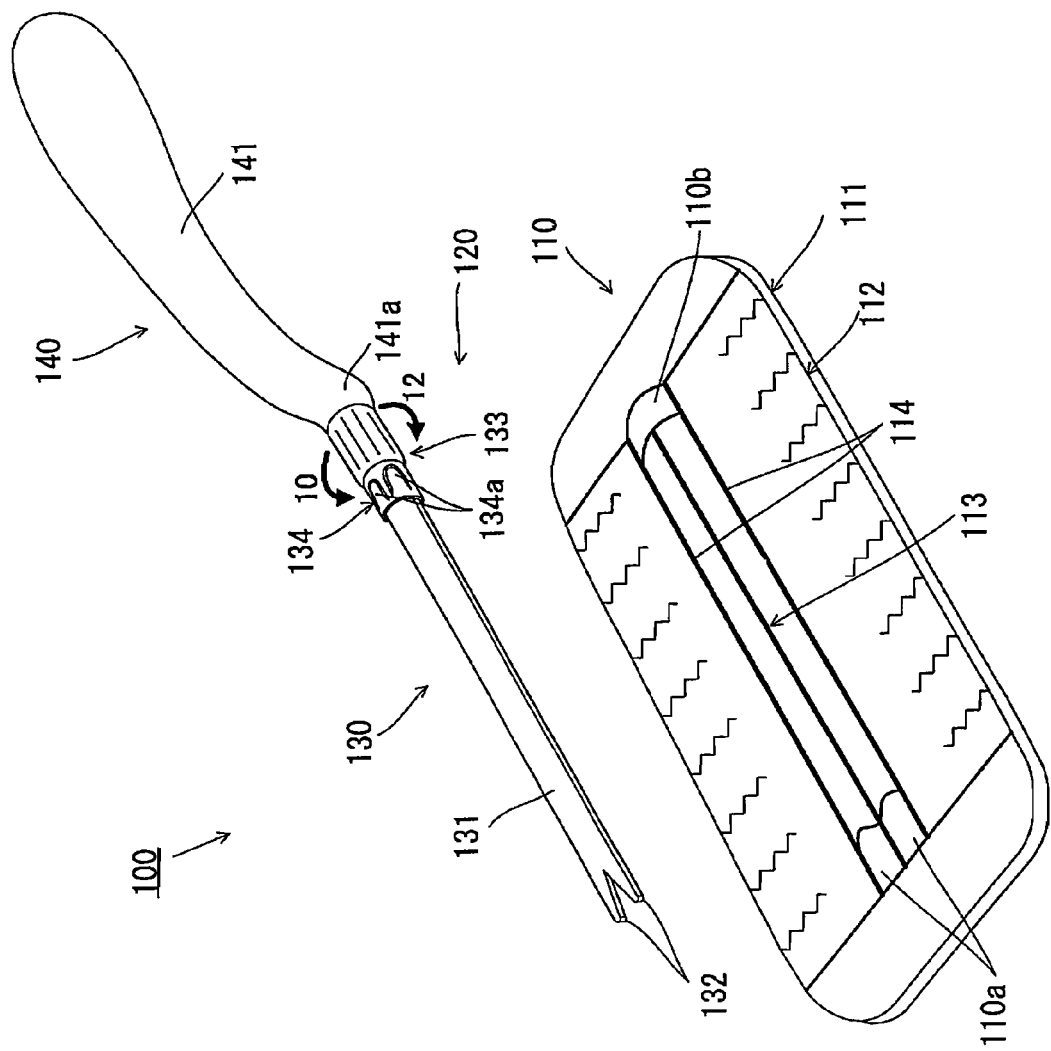
FIG. 1 is a perspective view showing a cleaning tool 100 according to an embodiment of the present invention, in a disassembled state into a cleaning element 110 and a cleaning element holder 120.

FIG. 1 shows the cleaning tool 100 according to this embodiment in perspective view, in a state disassembled into a cleaning element 110 and a cleaning element holder 120. As shown in FIG. 1, the cleaning tool 100 comprises the cleaning element 110 and the cleaning element holder 120.

The cleaning element 110 has a function of removing dirt on the region to be cleaned. The cleaning element 110 is available in a sheet-like form, and in use, it is loosened such that its volume is increased. As shown in FIG. 1, the cleaning element 110 is a sheet element having a rectangular shape in plan view and extending in a predetermined longitudinal direction (the direction of the length), which will be explained in more detail below. The cleaning element 110 includes a cleaning element body 111 and a holding sheet 112 stacked and fusion bonded together at a fusion bonded part 113 and fusion bonded parts 114 which are parallel to each other. Further, a first held part 110a and a second held part 110b are provided on the front end side (the left side as viewed in FIG. 1) and the rear end side (the right side as viewed in FIG. 1) of the cleaning element 110, respectively. The cleaning element holder 120 holds the cleaning element 110 at the first and second held parts 110a, 110b. The cleaning element 110 is a feature that corresponds to the "cleaning element" according to an embodiment of this invention. Further, the cleaning element 110 may also have a square or other shape in plan view as necessary.

The cleaning element holder 120 is removably attached to the cleaning element 110. The cleaning element holder 120 is an elongate member including the holder body 130 and the handle 140 connected to each other. The cleaning element holder 120 is a feature that corresponds to the "cleaning element holder" according to an embodiment of this invention. The handle 140 includes a handle body 141 extending in an elongate form and a connection 141a disposed between the handle body 141 and the holder body 130. The handle body 141 is a portion to be held by a user. The handle body 141 and the holder body 130 are fixedly connected at the connection 141a.

The holder body 130 has a function of detachably holding the cleaning element 110. The holder body 130 includes a holding element 131 and a movable part 133. The holding element 131 is fixedly attached to the handle 140 and is configured as a long plate-like portion extending substantially in the same direction as the handle body 141. The holding element 131 has a pair of right and left claws 132 on the tip end portion (the left end as viewed in FIG. 1) and thus has a bifurcated form. The claws 132 serve to hold the front end side of the cleaning element 110 by engagement with the first held part 110a of the cleaning element 110. The movable part 133 is allowed to rotate around the holding element 131 as shown by arrows 10, 12 in FIG. 1 by user's manual operation. Further, the movable part 133 has a lock mechanism for locking it in any position selected by such manual operation when the user releases the movable part 133 after the manual operation. A rotary element 134 is integrally connected to the movable part 133 and coaxially rotates. The rotary element 134 has a plurality of catch ribs 134a on the outer surface. The catch ribs 134a serve to hold the rear end side of the cleaning element 110 by engagement with the second held part 110b of the cleaning element 110. The holding element 131 can have an appropriately selected sectional shape such as a circular or polygonal section forming a rod-like shape and a rectangular section forming a plate-like shape.

Figure 2:
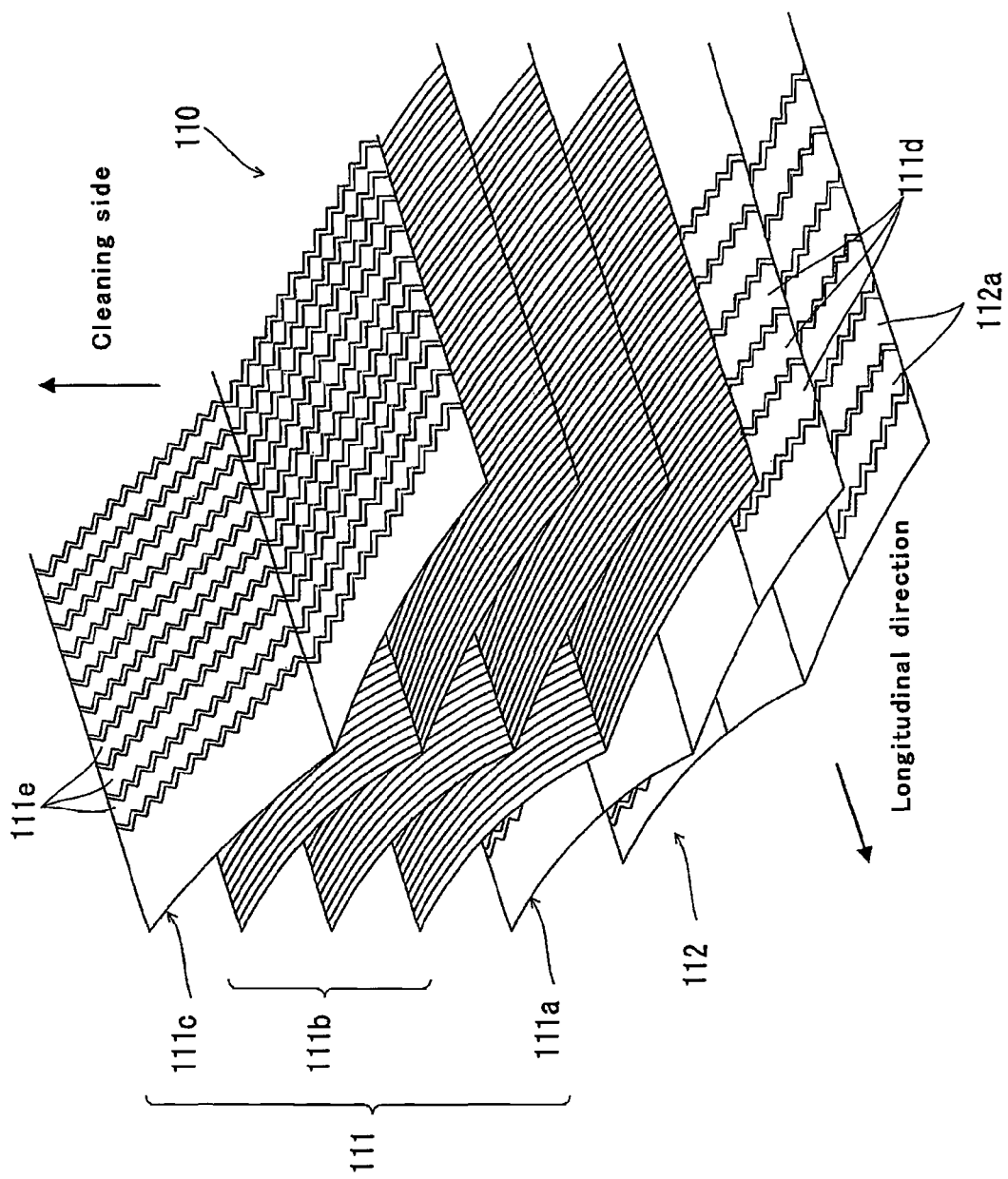
FIG. 2 is a perspective view of the cleaning element 110 of FIG. 1 which is shown separated into component elements.

Referring to FIG. 2, the structure of the cleaning element 110 is specifically described. FIG. 2 is a perspective view of the cleaning element 110 of FIG. 1 which is shown separated into component elements.

As shown in FIG. 2, in the cleaning element 110 of this embodiment, the holding sheet 112 is overlaid on the cleaning element body 111 on the cleaning side (which is also referred to as the "lower region side" or the "back"). Further, the cleaning element body 111 has a cleaning side sheet 111c, a fiber assembly 111b and a base sheet 111a placed one on the other in this order from the cleaning side (lower region side). In this case, the holding sheet 112 and the base sheet 111a are overlaid on the side of the fiber assembly 111b opposite the cleaning side sheet 111c (lower region side sheet) and form an upper region side sheet.

The base sheet 111a, the fiber assembly 111b and the cleaning side sheet 111c which form the cleaning element body 111 have the same rectangular sheet-like form in plan view and extend in a longitudinal direction of the cleaning element 110. The fiber assembly 111b and the cleaning side sheet 111c form a brush-like part having a dirt removing function, which is also referred to as the "brush portion". The cleaning element 110 may be of disposable type designed for single use, disposable type designed for multiple use which can be used several times, while holding dust which has been removed from the region to be cleaned, on the brush portion, or reusable type which can be reused by washing. Further, in this embodiment, the cleaning element body 111 of the cleaning element 110 is described as a structure having the base sheet 111a, the fiber assembly 111b and the cleaning side sheet 111c stacked in layer, but may be constructed as a structure having an additional fiber layer and/or sheet.

The holding sheet 112, the base sheet 111a and the cleaning side sheet 111c have a plurality of zigzag strips (strip portions) extending in a direction crossing the longitudinal direction of the cleaning element 110. Specifically, the holding sheet 112 comprises a plurality of strips 112a arranged in parallel and extending in a direction crossing the longitudinal direction of the cleaning element 110. The base sheet 111a comprises a plurality of strips 111d arranged in parallel and extending in a direction crossing the longitudinal direction of the cleaning element 110. The cleaning side sheet 111c comprises a plurality of strips 111e arranged in parallel and extending in a direction crossing the longitudinal direction of the cleaning element 110. An improved structure which can easily trap dust and thus has a higher cleaning function can be realized by the zigzag strips of the sheets. The strips may have the same kind or different kinds of shape appropriately selected from various shapes, such as zigzag, linear and curved shapes.

The construction of the nonwoven fabric forming the above-described base sheet 111a, cleaning side sheet 111c and holding sheet 112 and the construction of the fiber assembly 111b are now explained in detail.

The base sheet 111a, the cleaning side sheet 111c and the holding sheet 112 can typically be formed of sheet-type nonwoven fabric comprising thermal melting fibers (thermoplastic fibers) and thus referred to as nonwoven fabric sheet. The base sheet 111a and the holding sheet 112 herein form the "sheet element of nonwoven fabric" according to an embodiment of this invention. The nonwoven fabric has a sheet-like configuration formed by fixing or entangling fibers by mechanical, chemical or heat treatment. The nonwoven fabric partly includes thermoplastic fibers and thus can be fusion bonded. Further, the nonwoven fabric has a plurality of strips. Examples of the thermal melting fibers (thermoplastic fibers) include polyethylene, polypropylene and polyethylene terephthalate. The nonwoven fabric may be manufactured by through-air bonding, spun bonding, thermal bonding, spun lacing, point bonding, melt blowing, stitch bonding, chemical bonding, needle punching or other similar processes. This nonwoven fabric is a feature that corresponds to the "nonwoven fabric" according to an embodiment of this invention. In order to enhance the dust wiping function, it is preferred to use a nonwoven fabric having higher rigidity. Further, as an alternative to or in addition to the nonwoven fabric, a material to be worked into strips, such as urethane, sponge, woven fabric, net and split cloth, may be used.

The fiber assembly 111b is a single fiber structure formed by fibers, a fiber structure having fibers aligned in the length direction and/or the radial direction (twist yarn, spun yarn, yarn to which a plurality of filaments are partially connected), or an assembly of the fiber structures. The fiber assembly 111b partially includes thermoplastic fibers and can be fusion bonded. The fibers forming the fiber assembly 111b are elements of yarn, textile or the like and defined as being thin and flexible fibers having a substantially longer length compared with the thickness. Typically, a long continuous fiber is defined as a filament and a short fiber as a staple. The proximal ends of the fibers of the fiber assembly 111b are bonded at the fusion bonded parts 113 and 114. The fibers of the fiber assembly 111b each have one end fixed at the fusion bonded parts and the other free end (distal end) on the opposite side. The fibers of the fiber assembly 111b extend in a direction crossing the longitudinal direction of the cleaning element 110 (or the fiber assembly 111b). The fiber assembly 111b extending in a direction crossing the longitudinal direction of the cleaning element 110 is a feature that corresponds to the "fiber assembly comprising a plurality of fibers extending in the predetermined direction" according to this embodiment. The fiber assembly 111b is also referred to as the "fiber bundle" having a plurality of fibers in a bundle.

In the representative example shown in FIG. 2, the fiber assembly 111b comprises three fiber layers, but it may comprise one or more fiber layers as necessary. Preferably, the fiber assembly 111b has a planar structure having a predetermined flat or curved region and has a three-dimensional form having a certain thickness or has a thin sheet-like form. The "fiber assembly" is typically formed of polyethylene (PE), polypropylene (PP), polyethylene terephthalate (PET), nylon, rayon or the like. In practical use, an assembly of filaments formed by opening a tow is frequently used as the fiber assembly. It is particularly preferable that the fiber assembly comprises conjugated fibers having a core of polypropylene (PP) or polyethylene (PE) and a core covering sheath of polyethylene (PE). Further, the filaments of the fiber assembly are preferred to have a fineness of 1 to 50 dtex, more preferably 2 to 10 dtex. The individual fiber assembly may contain fibers of substantially the same fineness or of different finenesses.

Further, in order to enhance the dust wiping function, it is preferred to use a fiber assembly including fibers having higher rigidity or fibers having higher fineness. It is further preferred that the fiber assembly has crimped fibers. Here, the crimped fibers are fibers subjected to a predetermined crimping process and easily entangled with each other. With the fibers being crimped, the fiber assembly becomes bulkier than before the holder is attached thereto, and dust can be easily captured by the crimped portions. This structure can be realized especially by using crimped fibers opened from a tow.

For the fiber assembly, flat yarns or split yarns may also be employed. The flat yarns are prepared by slitting a film into tapes and by stretching the tapes in the longitudinal direction. The split yarns are prepared by splitting a thermoplastic film resin in the direction perpendicular to the orientation direction of the resin so that the film is fibrillated and interconnected into a net shape. Alternatively, a nonwoven fabric which is bulky and has low fiber density, such as a through-air bonded nonwoven fabric, may be employed to form the fiber assembly.

The kinds and numbers of the component parts of the cleaning element 110 are not limited to those described in the above-described example, and can be selected as necessary.

Figure 3:
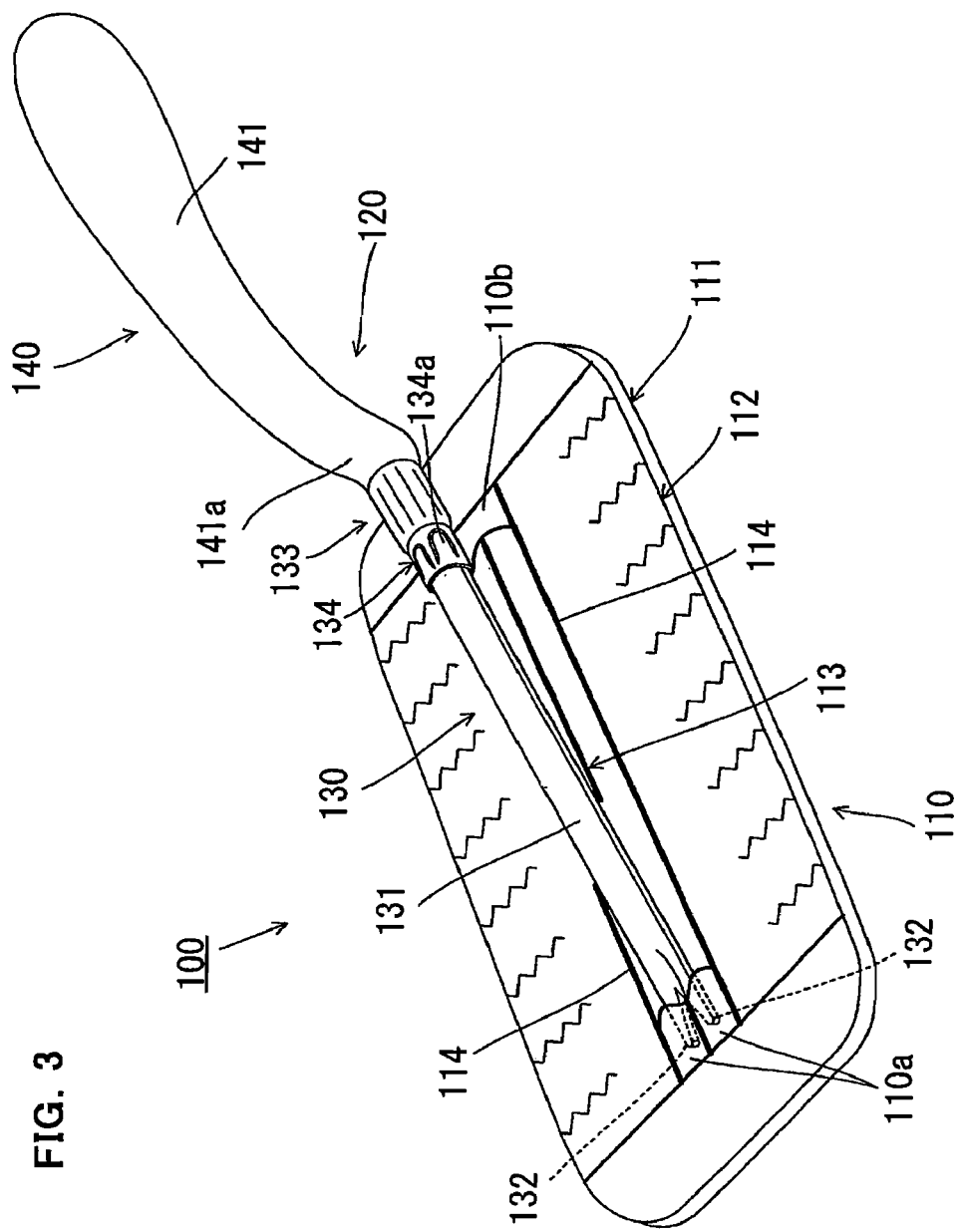
FIG. 3 is a perspective view showing the process of attaching the cleaning element 110 to the cleaning element holder 120 in this embodiment.
Figure 4:
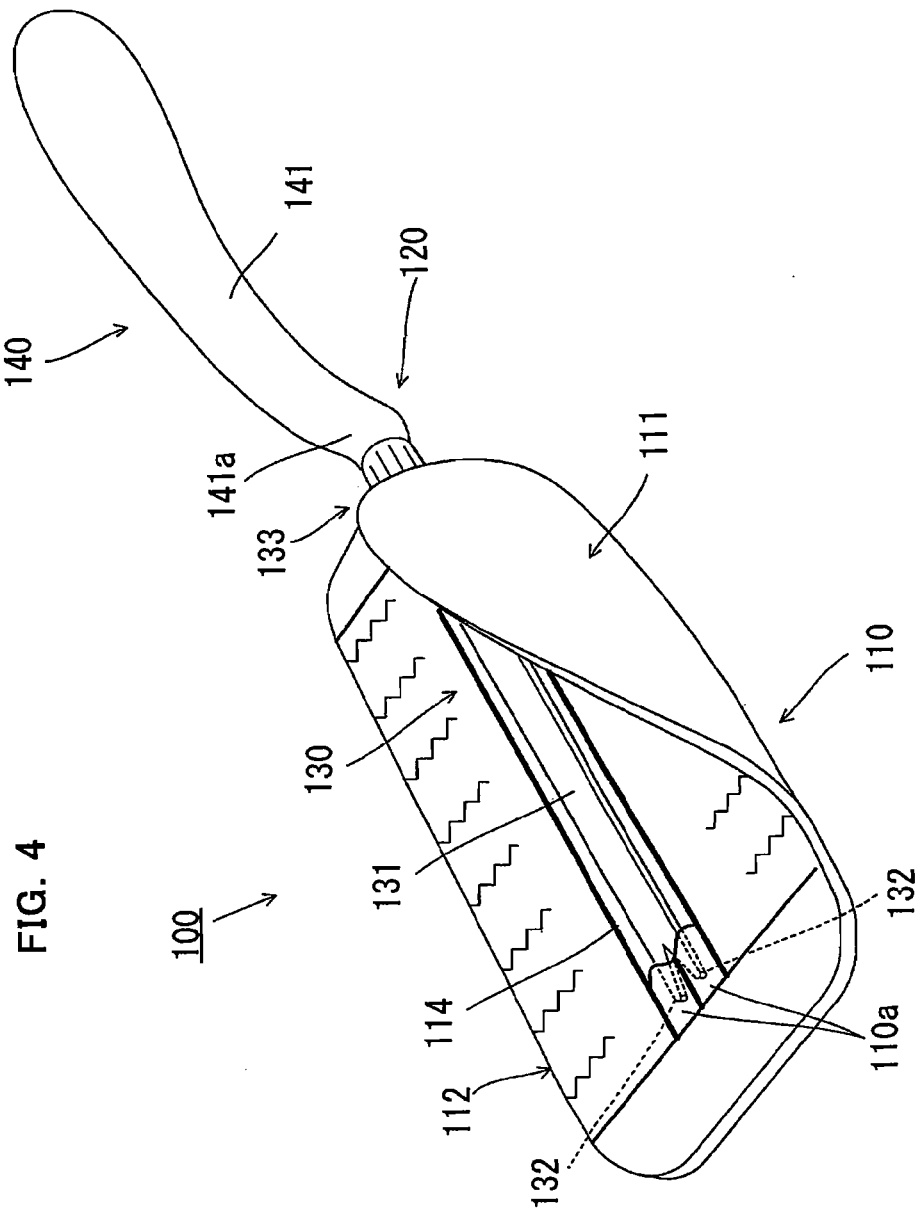
FIG. 4 is a perspective view showing the process of attaching the cleaning element 110 to the cleaning element holder 120 in this embodiment.
Figure 5:
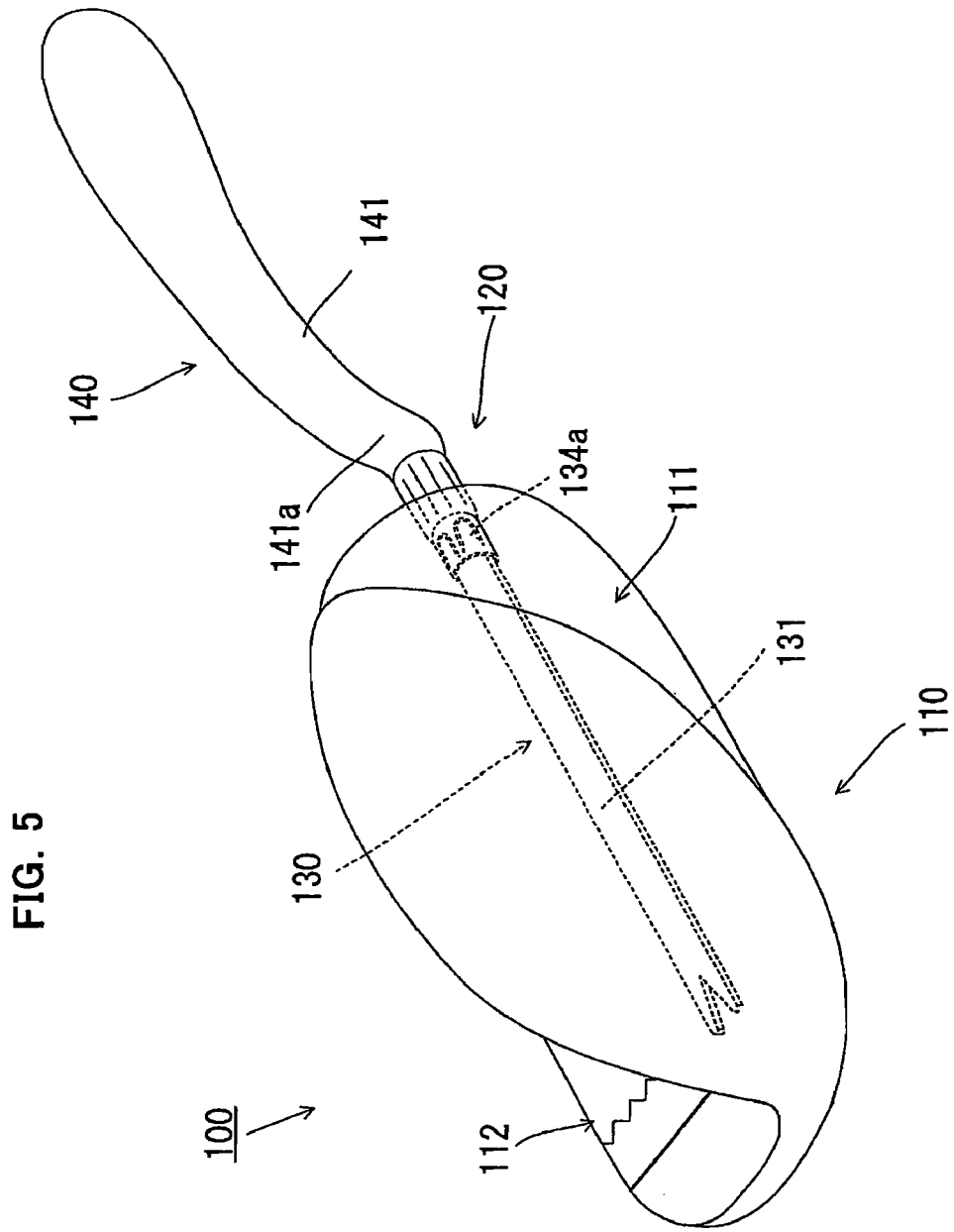
FIG. 5 is a perspective view showing the process of attaching the cleaning element 110 to the cleaning element holder 120 in this embodiment.

Now, the manner of attaching the cleaning element 110 and the cleaning element holder 120 which have the above-described construction to each other is explained with reference to FIGS. 3 to 5. FIGS. 3 to 5 are perspective views showing the process of attaching the cleaning element 110 to the cleaning element holder 120 in this embodiment.

First, as shown in FIG. 3, the claws 132 formed on the tip of the holding element 131 of the holder body 130 are inserted into the first held part 110a provided on the front end side of the cleaning element 110. Thus, the front end side of the cleaning element 110 is held by engagement with the tip portion of the holding element 131. Further, although not shown, the second held part 110b provided on the rear end side of the cleaning element 110 is caught on the assigned catch rib 134a of the rotary element 134. Thus, the rear end side of the cleaning element 110 is held by engagement with the rear end portion of the holding element 131. The claws 132 and the catch ribs 134a herein comprise the "two holding parts" in this invention, and the first and second held parts 110a, 110b comprise the "first and second held regions" in this invention.

In this invention, it is only necessary for the first and second held parts 110a, 110b to be engageable with the holding element 131, and thus they can be provided in an appropriate form, such as a form of a bag, a belt or a string, as necessary. Further, the claws 132 and the catch ribs 134a of the holding element 131 may also have a form of a hook or a projection rather than the form of a claw or a rib.

Next, the movable part 133 is manually turned, for example, in the direction shown by the arrow 10 in FIG. 1. By this operation, with the front end side of the cleaning element 110 held by the tip portion of the holding element 131, the rotary element 134 with the catch rib 134a holding the rear end side of the cleaning element 110 rotates in the direction of the arrow 10. As a result, the cleaning element 110 is wrapped in a helical form around the holder body 130 in such a manner that the holding sheet 112 forming the outer surface of the cleaning element moves toward the outer surface of the holder body 130. In other words, the cleaning tool is constructed such that, when the cleaning element 110 is wrapped in a helical form around the holder outer surface, the holding sheet 112 moves toward the holder outer surface and is thus positioned on the internal side of the cleaning element. Thus, the holding sheet 112 always faces the holder outer surface or is kept in contact with the holder outer surface. In this case, the holding sheet 112 is designed to have a cleaning element outer surface which has predetermined dimensions and can extend in the longitudinal direction of the holder body 130. The holding sheet 112 comprises the "cleaning element outer surface having predetermined dimensions" in this invention. Specifically, when the rotary element 134 is rotated clockwise about 90° by user's manual operation of the movable part 133, the state shown in FIG. 4 is obtained. When the rotary element 134 is further rotated clockwise about 270°, the state shown in FIG. 5 is obtained. Then, even after the user releases the movable part 133, the state shown in FIG. 5 is maintained by the lock mechanism of the movable part 133.

In this manner, the cleaning element 110 is wrapped around the holding element 131 while being subjected to predetermined torsion or twist. As a result, the volume of the sheet-type cleaning element 110 can be increased. Further, preferably, before or after such wrapping of the cleaning element 110, the cleaning element 110 is loosened by hand such that its volume is increased. Further, a cleaning face is created over the entire face of the cleaning element 110. Therefore, dust can be trapped on the entire face of the cleaning element 110, and the user can use the cleaning tool without being concerned about the position of the cleaning face of the cleaning element 110 during cleaning operation.

The present invention is not limited to the embodiment as described above, but rather, may be added to, changed, replaced with alternatives or otherwise modified. For example, the following provisions can be made in application of this embodiment.

In this invention, it is essential that predetermined torsion or twist can be applied to the cleaning element 110. Therefore, cleaning element holders having a construction which is different from that of the cleaning element holder 120 in the above-described embodiment can be appropriately used. Now, different embodiments of the "cleaning element holder" according to an embodiment of this invention are explained with reference to FIGS. 6 to 9. In FIGS. 6 to 9, parts identical to those in the above embodiment shown in FIG. 1 are given like numerals as in the first embodiment and will not be described.

Figure 6:
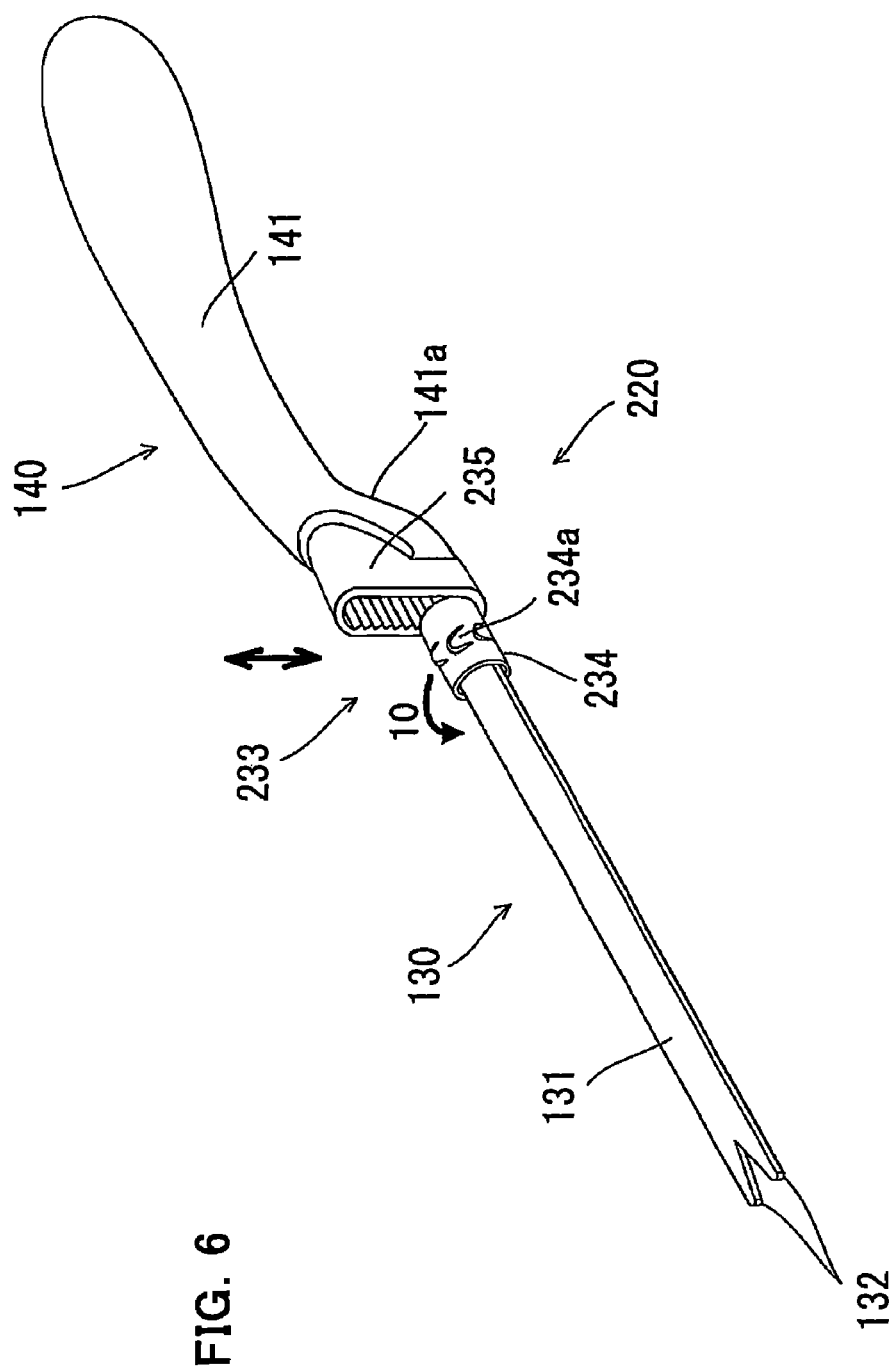
FIG. 6 is a perspective view showing a cleaning element holder 220 according to another embodiment.

FIG. 6 is a perspective view showing the construction of a cleaning element holder 220 in a different embodiment. The cleaning element holder 220 substantially has the same construction as the cleaning element holder 120 except for a movable part 233. The movable part 233 is allowed to move linearly as shown by a double-headed arrow in FIG. 6 by user's manual operation. Further, the movable part 233 has a lock mechanism for locking it in any position selected by such manual operation when the user releases the movable part 233 after the manual operation. The movable part 233 includes a rotary element 234 having a plurality of catch ribs 234a on the outer surface, and an operating member 235 which is operated to rotate the rotary element 234. The operating member 235 is designed as a gear driving ratchet which converts the linear motion of the operating member 235 into rotation of the rotary element 234 by engagement between gear teeth formed in the inner surface of the operating member 235 and gear grooves of the rotary element 234.

In order to attach the cleaning element 110 to the cleaning element holder 220 having the above-described construction, first, the front end side (the first held part 110a shown in FIG. 1) of the cleaning element 110 is held by the claws 132 of the holding element 131, and the rear end side (the second held part 110b shown in FIG. 1) of the cleaning element 110 is held by the assigned catch rib 134a of the rotary element 134. In this state, the operating member 235 is pushed down by hand. By this operation, with the front end side of the cleaning element 110 held by the tip portion of the holding element 131, the rotary element 234 with the catch rib 234a holding the rear end side of the cleaning element 110 rotates in the direction of the arrow 10. As a result, the cleaning element 110 is wrapped in a helical form around the holder body 130. The claws 132 and the catch ribs 234a herein comprise the "two holding parts" in this invention.

Figure 7:
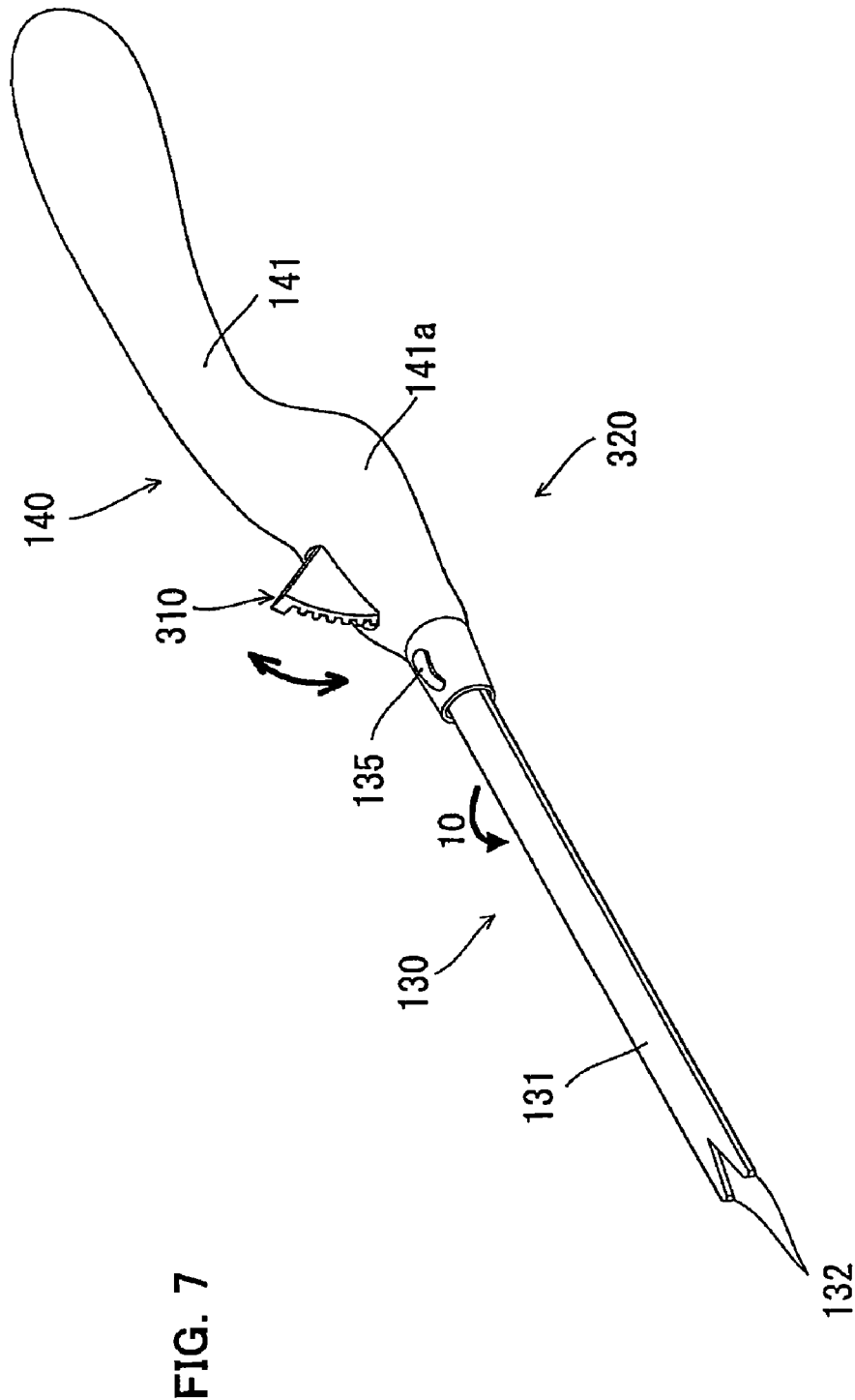
FIG. 7 is a perspective view showing a cleaning element holder 320 according to a different embodiment.

FIG. 7 is a perspective view showing the construction of a cleaning element holder 320 in a different embodiment. The cleaning element holder 320 is different from the cleaning element holder 120 in that the holding element 131 can rotate with respect to the handle 140. Specifically, the cleaning element holder 320 has a push lever 310 which is allowed to rotate as shown by a double-headed arrow in FIG. 7. The push lever 310 is connected to the holding element 131 via a connecting mechanism which is not shown and formed by a gear or the like. By pushing the push lever 310, the rotation of the push lever 310 is converted into rotation of the holding element 131.

In order to attach the cleaning element 110 to the cleaning element holder 320 having the above-described construction, first, the front end side (the first held part 110a shown in FIG. 1) of the cleaning element 110 is held by the claws 132 of the holding element 131, and the rear end side (the second held part 110b shown in FIG. 1) of the cleaning element 110 is held by a projecting rib 135 provided on the rear end side of the holder body 130. In this state, the push lever 310 is pushed down by hand. By this operation, with the rear end side of the cleaning element 110 held by the projecting rib 135, the holding element 131 with the front end side of the cleaning element 110 held by the claws 132 rotates in the direction of the arrow 10. As a result, the cleaning element 110 is wrapped in a helical form around the holding element 131. The claws 132 and the projecting rib 135 herein comprise the "two holding parts" in this invention.

Figure 8:
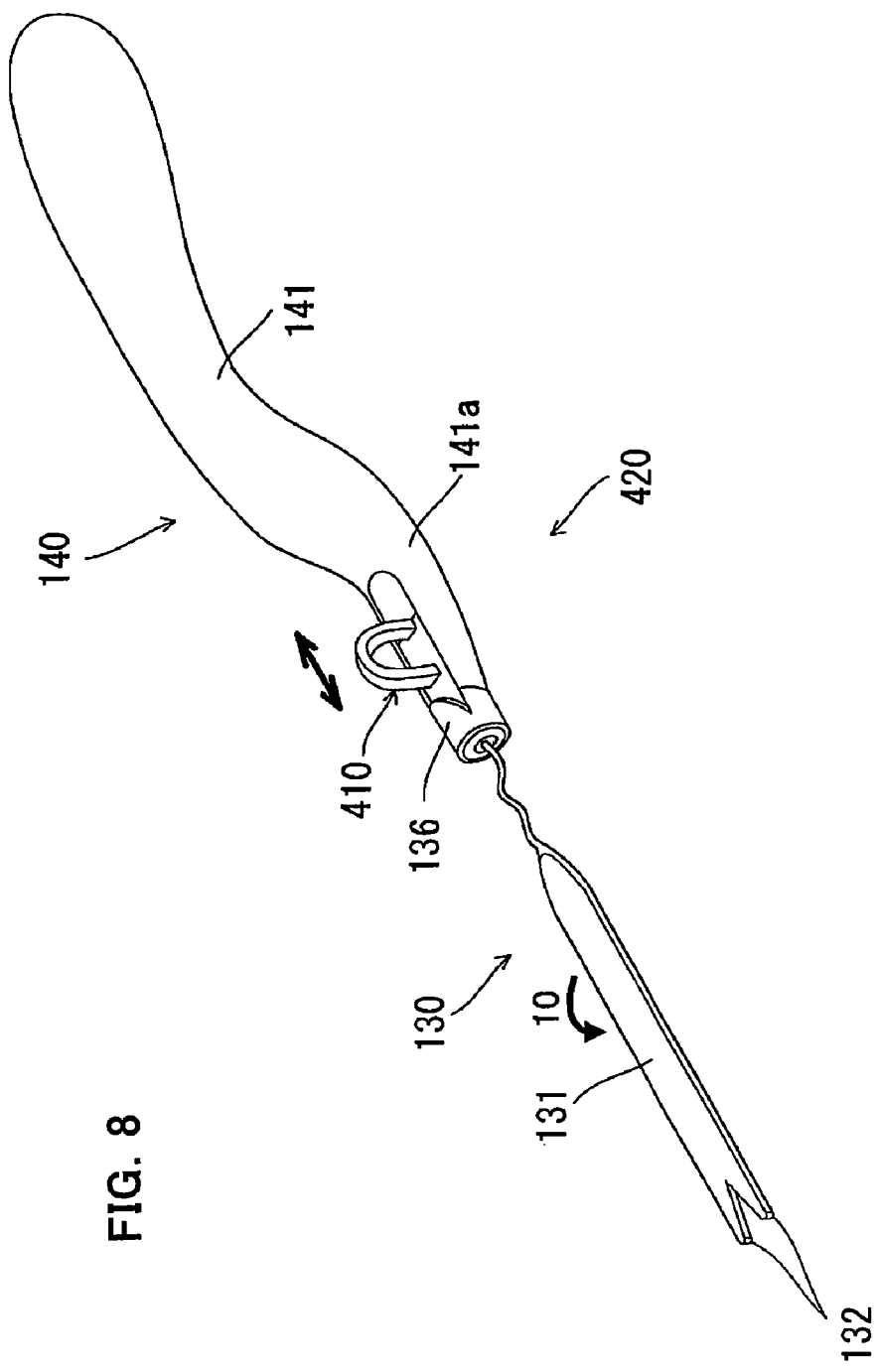
FIG. 8 is a perspective view showing a cleaning element holder 420 according to a different embodiment.

FIG. 8 is a perspective view showing the construction of a cleaning element holder 420 in a different embodiment. Like the cleaning element holder 320, the cleaning element holder 420 is constructed such that the holding element 131 can rotate with respect to the handle 140. Specifically, the cleaning element holder 420 has a pull-in lever 410 which is allowed to slide as shown by a double-headed arrow in FIG. 8. The pull-in lever 410 is connected to the holding element 131 via a connecting mechanism which is not shown and formed by a gear or the like. By pulling in the pull-in lever 410, the sliding motion of the pull-in lever 410 is converted into rotation of the holding element 131.

In order to attach the cleaning element 110 to the cleaning element holder 420 having the above-described construction, first, the front end side (the first held part 110a shown in FIG.

1) of the cleaning element 110 is held by the claws 132 of the holding element 131, and the rear end side (the second held part 110b shown in FIG. 1) of the cleaning element 110 is held by a holding piece 136 provided on the rear end side of the holder body 130. In this state, the pull-in lever 410 is pulled in by hand. By this operation, with the rear end side of the cleaning element 110 held by the holding piece 136, the holding element 131 with the front end side of the cleaning element 110 held by the claws 132 rotates in the direction of the arrow 10. As a result, the cleaning element 110 is wrapped in a helical form around the holding element 131. This cleaning element holder 420 and the above-described cleaning element holder 320 may also be constructed such that the user can directly rotate the holding element 131. The claws 132 and the holding piece 136 herein comprise the "two holding parts" in this invention.

Figure 9:
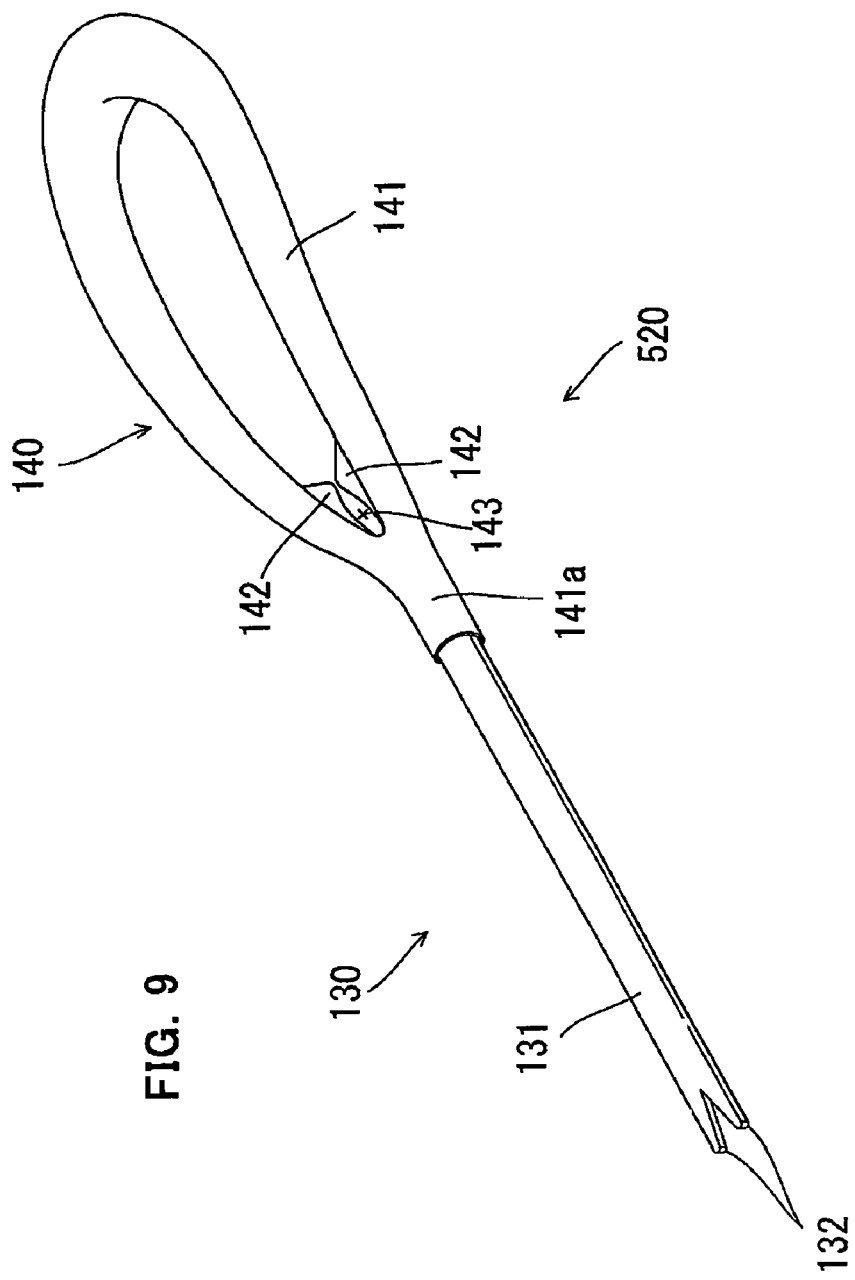
FIG. 9 is a perspective view showing a cleaning element holder 520 according to a different embodiment.

FIG. 9 is a perspective view showing the construction of a cleaning element holder 520 in a different embodiment. The cleaning element holder 520 is different from the cleaning element holder 120 in that a movable part is not provided with respect to the handle 140 and predetermined torsion or twist is applied to the cleaning element 110 by user's direct wrapping operation. Specifically, the holding element 131 of the holder body 130 is fixedly connected to the handle 140, and the handle 140 has a narrowed area 143 demarcated by a pair of projections 142. The narrowed area 143 forms a holding space for holding the rear end side of the cleaning element 110 between the projections 142.

In order to attach the cleaning element 110 to the cleaning element holder 520 having the above-described construction, first, the front end side (the first held part 110a shown in FIG. 1) of the cleaning element 110 is held by the claws 132 of the holding element 131. Then, the user holds the rear end side of the cleaning element 110 and wraps the cleaning element 110 in a helical form around the holding element 131. Subsequently, the user retains the rear end side of the cleaning element 110 by pushing it into the narrowed area 143. The claws 132 and the narrowed area 143 herein comprise the "two holding parts" in this invention.

In the above embodiment, the cleaning element 110 is described as being formed by the sheet element of nonwoven fabric and the fiber assembly. In this invention, however, the cleaning element may be formed only by a sheet element of nonwoven fabric.

While the invention has been particularly shown and described with reference to preferred embodiments thereof, it will be understood by those skilled in the art that various changes in form and details may be made therein without departing from the spirit and scope of the invention.

What we claim is:

1. A cleaning tool for wiping a region to be cleaned, comprising:
    an elongate cleaning element holder, and
    a cleaning element having an outer surface which has predetermined dimensions and can extend in a longitudinal direction of the cleaning element holder, the cleaning element being designed to be attached to the cleaning element holder,
    wherein, when the cleaning element is first attached to the cleaning element holder at opposite ends of the cleaning element holder and after being attached the cleaning element holder is manipulated, the cleaning element becomes wrapped in a helical form around an outer surface of the cleaning element holder such that the cleaning element outer surface moves toward the outer surface of the cleaning element holder.

2. The cleaning tool according to claim 1, wherein the cleaning element comprises a sheet element of nonwoven fabric and a fiber assembly which are stacked in layer and bonded together, the fiber assembly having a plurality of fibers extending in a predetermined direction, and
    the cleaning element is wrapped in a helical form around the outer surface of the cleaning element holder such that the sheet element is positioned on the internal side of the cleaning element when the cleaning element is attached to the cleaning element holder.

3. A cleaning tool for wiping a region to be cleaned, comprising:
    an elongate cleaning element holder, and
    a cleaning element to be attached to the cleaning element holder, the cleaning element holder having two holding parts for holding the cleaning element, and the cleaning element having first and second held regions to be held by the respective first and second holding parts,
    wherein, after the cleaning element is attached to the cleaning element holder, the first held region is held by the first holding part and then rotated in this state together with the first holding part, whereby the cleaning element is twisted between the first and second held regions and thus wrapped in a helical form around an outer surface of the cleaning element holder.

4. The cleaning tool according to claim 3, wherein the cleaning element comprises a sheet element of nonwoven fabric and a fiber assembly which are stacked in layer and bonded together, the fiber assembly having a plurality of fibers extending in a predetermined direction, and
    the cleaning element is wrapped in a helical form around the outer surface of the cleaning element holder such that the sheet element is positioned on the internal side of the cleaning element when the cleaning element is attached to the cleaning element holder.

5. A cleaning element which is adapted to be attached to an elongate cleaning element holder and used to wipe a region to be cleaned, comprising:
    a cleaning element outer surface of the cleaning element which has predetermined dimensions and extends in a longitudinal direction of the cleaning element holder,
    wherein the cleaning element is wrapped in a helical form around an outer surface of the cleaning element holder after first being attached to the cleaning element holder such that the cleaning element outer surface moves toward the outer surface of the cleaning element holder.

6. The cleaning element according to claim 5, wherein the cleaning element comprises a sheet element of nonwoven fabric and a fiber assembly which are stacked in layer and bonded together, the fiber assembly having a plurality of fibers extending in a predetermined direction, and when the cleaning element is attached to the cleaning element holder, the cleaning element is wrapped in a helical form around the outer surface of the cleaning element holder such that the sheet element is positioned on the internal side of the cleaning element.

7. A article for cleaning which is adapted to be attached to a holder and used to wipe a region to be cleaned, comprising:
    a cleaning element which is adapted to be attached to an elongate cleaning element holder, and the cleaning element has a predetermined length and includes first and second held regions to be held by respective first and second holding parts provided on the cleaning element holder in the length direction of the cleaning element,
    wherein the first held region is held by the first holding part and then rotated in this state together with the first holding part independently of the second holding part, whereby the cleaning element is twisted between the first and second held regions and thus wrapped in a helical form around an outer surface of the cleaning element holder when the cleaning element is attached to the cleaning element holder.

8. The cleaning element according to claim 7, wherein the cleaning element comprises a sheet element of nonwoven fabric and a fiber assembly which are stacked in layer and bonded together, the fiber assembly having a plurality of fibers extending in a predetermined direction, and when the cleaning element is attached to the cleaning element holder, the cleaning element is wrapped in a helical form around the outer surface of the cleaning element holder such that the sheet element is positioned on the internal side of the cleaning element.

9. The cleaning element according to claim 5, wherein the cleaning element is first attached at both opposite ends of the cleaning element to the cleaning element holder before being wrapped in a helical form.

10. The cleaning element according to claim 5, wherein the cleaning element is first attached at only one opposite end of the cleaning element to the cleaning element holder before being wrapped in a helical form.

* * * * *